(12) United States Patent
Workens

(10) Patent No.: US 6,811,078 B2
(45) Date of Patent: Nov. 2, 2004

(54) POINT-OF-TRANSACTION MACHINE WITH IMPROVED VERSATILITY AND RELATED METHOD

(76) Inventor: Monica L. Workens, 118 Riverway, Unit #8, Boston, MA (US) 02215

(*) Notice: Subject to any disclaimer, the term of this patent is extended or adjusted under 35 U.S.C. 154(b) by 95 days.

(21) Appl. No.: 10/340,065

(22) Filed: Jan. 10, 2003

(65) Prior Publication Data
US 2003/0132282 A1 Jul. 17, 2003

Related U.S. Application Data
(60) Provisional application No. 60/349,817, filed on Jan. 17, 2002.

(51) Int. Cl.[7] .............................................. G06F 17/60
(52) U.S. Cl. ...................... 235/379; 235/375; 235/382; 235/492; 235/487; 235/380; 902/8; 902/9; 902/10; 902/11; 902/12; 902/13; 902/14; 902/15; 902/16; 902/17
(58) Field of Search ............................... 235/379, 375, 235/385, 382, 492, 487, 380, 381, 382.5, 363, 486, 493; 209/534; 902/8–16, 25, 26

(56) References Cited

U.S. PATENT DOCUMENTS

| | | | |
|---|---|---|---|
| 4,634,845 A | | 1/1987 | Hale et al. |
| 5,220,501 A | | 6/1993 | Lawlor et al. |
| 5,276,311 A | * | 1/1994 | Hennige ...................... 235/380 |
| 5,473,143 A | | 12/1995 | Vak et al. |
| 5,546,523 A | * | 8/1996 | Gatto ........................ 345/811 |
| 5,578,808 A | * | 11/1996 | Taylor ........................ 235/380 |
| 5,650,604 A | * | 7/1997 | Marcous et al. ............. 235/379 |
| 5,770,843 A | * | 6/1998 | Rose et al. .................. 235/380 |
| 5,955,961 A | * | 9/1999 | Wallerstein ................. 340/5.4 |
| 6,308,887 B1 | * | 10/2001 | Korman et al. ............. 235/379 |
| 6,328,206 B1 | * | 12/2001 | Schanz et al. .............. 235/379 |
| 6,354,490 B1 | * | 3/2002 | Weiss et al. ................ 235/379 |
| 6,457,640 B2 | * | 10/2002 | Ramachandran et al. ... 235/379 |
| 6,494,367 B1 | * | 12/2002 | Zacharias ................... 235/382 |
| 6,543,684 B1 | * | 4/2003 | White et al. ................ 235/379 |
| RE38,137 E | * | 6/2003 | Wynn ......................... 235/487 |
| 2002/0153414 A1 | | 10/2002 | Stoutenburg et al. |

OTHER PUBLICATIONS

CAT Product Description http://www.xpsystems.com/ProductDocumentation/CAT_Product%20Description.pdf.*

* cited by examiner

*Primary Examiner*—Karl D. Frech
*Assistant Examiner*—Daniel Walsh
(74) *Attorney, Agent, or Firm*—Harness, Dickey & Pierce, P.L.C.

(57) ABSTRACT

A point-of-transaction machine that allows global users to reach all aspects of their finances, from their brokerage account to their banks, mortgage accounts, credit card accounts and more. Unlike conventional ATMs where you can only reach your bank account(s), the initial screen when signed on will give the global user options on which account or accounts they want to transact business. This initial screen will satisfy the banking, mortgage, and security law requirements of most countries, including those of the United States and Canada where such companies are required to be independent. The point-of-transaction machine will collect fees for each transaction, similar to current ATM usage fee agreements and will allow certain users to complete transactions without fees.

18 Claims, 4 Drawing Sheets

POINT-OF-TRANSACTION MACHINE WITH IMPROVED VERSATILITY AND RELATED METHOD

CROSS-REFERENCE TO RELATED APPLICATIONS

This application claims the benefit of U.S. Provisional Patent Application Ser. No. 60/349,817, filed Jan. 17, 2002.

FIELD OF THE INVENTION

The present invention generally pertains to automated teller-type machines. More particularly, the present invention pertains to an automated teller-type machine with improved versatility and a related method. More specifically, but without restriction to the particular embodiment and/or use which is shown and described for purposes of illustration, the present invention relates to an automated teller-type machine that allows an authorized user to access bank accounts, access stock quotations, trade stock, pay bills and perform other financial transactions.

BACKGROUND OF THE INVENTION

Until recently, financial transactions, such as banking, non-banking investments and bill paying, were largely restricted to transactions that were conducted in-person where such services are provided or through the mail. While these manners of transactions are acceptable for their intended purposes, they are not always convenient for the customer or cost effective for the service provider.

With respect to in person transactions, it is rarely ever convenient to visit the office of the service provider. Such transactions are typically used only as a last recourse (e.g., on the due date of a required payment). Additionally, the introduction of a human component on behalf of the service provider increases the probability of human error. Furthermore, the additionally required workforce to handle such transactions necessarily increases the cost to the service provider.

With respect to a transaction conducted through the mail, a delay is encountered between the time a transaction is put in the mail and the time that the transaction is recorded by the services provider. Additionally, the customer does not always have the necessary supplies (e.g., checks, stamps, envelopes, and the like) on hand for transactions through the mail. Furthermore, mail may be misplaced or lost by the delivery service and thereby adversely effect the customer, as through fees and lost opportunities, for example.

In an effort to overcome many of the disadvantages associated with in person and mail transactions, the advent, growth and maturation of the Internet has provided a means for conducting financial transactions electronically from remote locations. While such transactions provide improved convenience, there are nonetheless certain disadvantages and limitations of this methodology. For example, not everyone needing to conduct financial transactions owns or has ready access to a computer or another such interface (e.g., WebTV ®) having access to the Internet. Furthermore, a significant number of the people with ready access to the Internet have serious reservations about transmitting confidential personal and financial information over the Internet. A further disadvantage concerns the fact that transactions conducted over the Internet can not involve cash but rather require an electronically identifiable account (e.g., savings account, checking or NOW account, credit card account) from or to which funds are electronically debited or credited.

It is also known to provide a point-of-transaction machine, commonly referred to as automated teller machines or ATMs, for conducting various activities, such as withdrawing or depositing funds, transferring funds between accounts and conducting a balance inquiry of an account. These activities, however, are relatively limited in scope and do not provide the user with a means by which to access services and information outside of the particular financial institution to which the automated teller machine is linked. Accordingly, users of ATMs are unable to conduct financial transactions related to non-banking investments or bill paying at an ATM.

Accordingly, a need exists in the pertinent art to improve customer convenience for financial transactions and to reduce the associated costs of the service provider.

SUMMARY OF THE INVENTION

It is a general object of the present invention to provide a point-of-transaction machine for various financial transactions which improves customer convenience and reduces associated costs to the service provider.

It is another object of the present invention to provide a point-of-transaction machine which permits a customer to access accounts from various financial institutions.

It is another object of the present invention to provide a point-of-transaction machine which permits a customer to trade stock and access stock quotations.

It is yet another object of the present invention to provide a point-of-transaction machine which allows the user to make real time transactions.

It is yet another object of the present invention to provide a point-of-transaction machine which reduces the possibility of human error.

It is yet another object of the present invention to provide a point-of-transaction machine which is conveniently located and accessible any time of the day.

It is yet another object of the present invention to provide a point-of-transaction machine which accepts cash and check deposits for electronic transactions.

It is still yet another object of the present invention to provide a point-of-transaction machine which has a touch responsive screen that varies in response to the financial institutions authorized for use by the customer.

It is yet another object of the present invention to provide a point-of-transaction machine which provides for improved security of transmitted data.

In one particular form, the subject invention provides a point-of-transaction machine that allows global users to reach all aspects of their finances, from their brokerage account to their banks, mortgage accounts, credit card accounts and more. Unlike conventional ATMs where you can only reach your bank account(s), the initial screen when signed on will give the global user options on which account or accounts they want to transact business. This initial screen will satisfy banking, mortgage, and security law requirements of keeping these companies separate and distinct. The point-of-transaction machine will collect fees for each transaction, similar to current ATM usage fee agreements and will allow certain users to complete transactions without fees.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
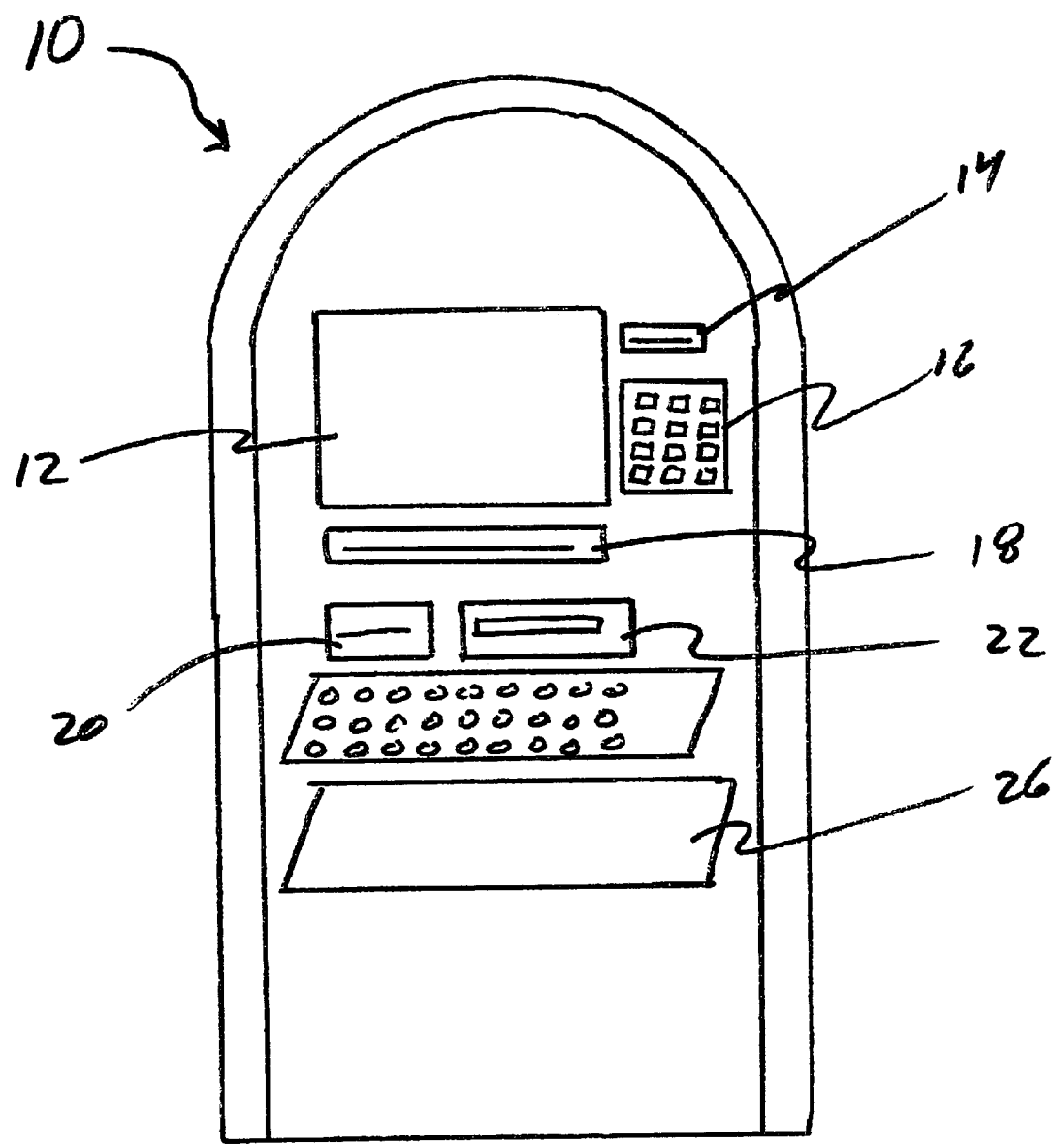
FIG. 1 is a simplified front view of an automated teller-type machine constructed in accordance with the teachings of a preferred embodiment of the present invention.
Figure 2:
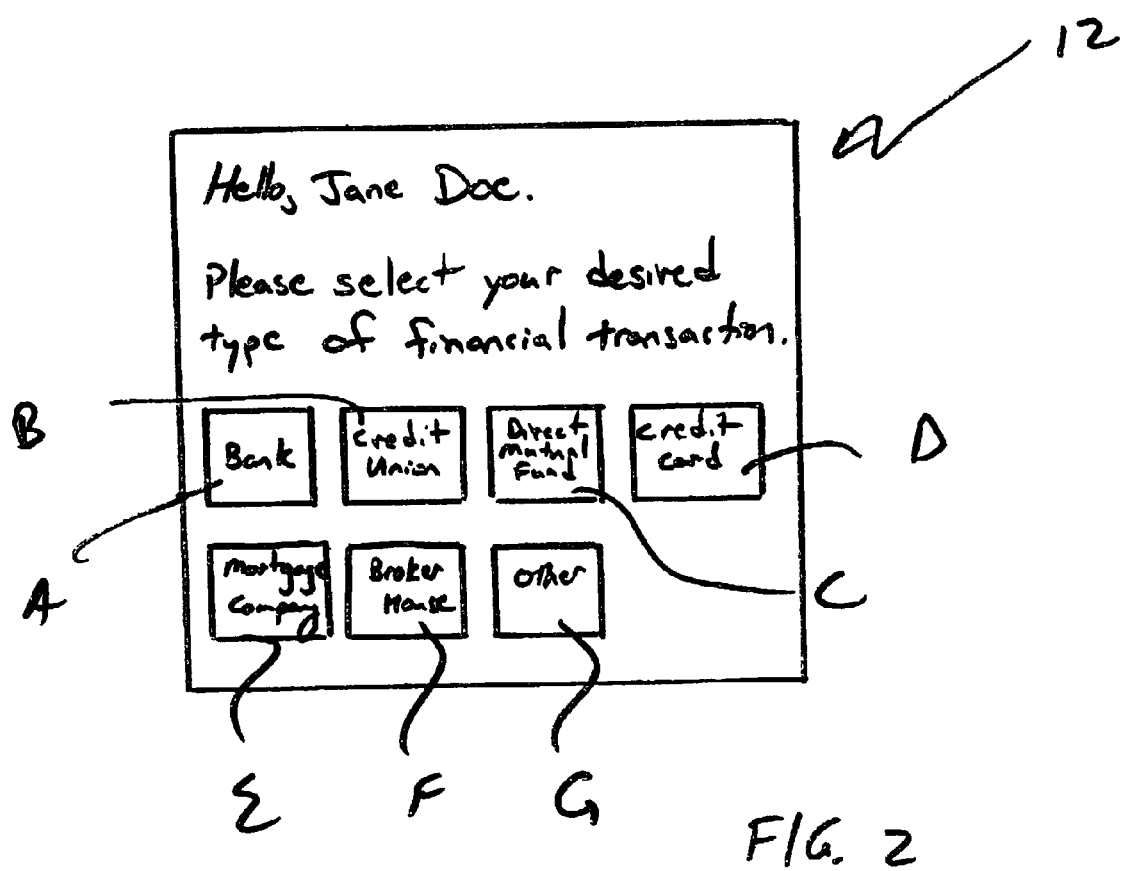
FIG. 2 is an enlarged and simplified front view of the touch responsive screen of the automated teller-type machine of the preferred embodiment of the present invention.

With general reference to FIGS. 1 and 2 of the drawings, a point-of-transaction machine constructed in accordance with the teachings of a preferred embodiment of the present invention is illustrated and generally identified at reference element 10. The teachings of the present invention are shown incorporated into an exemplary embodiment. However, those skilled in the art will readily appreciate after reading the remainder of this detailed description that the teachings of the subject invention are not so limited. In this regard, arrangements other than that shown in the drawings will be understood to fall within the scope of the present invention.

The point-of-transaction machine 10 of the present invention is an automated teller-type machine that can be publicly located for the convenience of the customers. It is anticipated that the point-of-transaction machine 10 will be made available in much the same way that conventional ATMs are made available. In this manner, the point-of-transaction machine 10 can be accessible any day, at any time.

The point-of-transaction machine 10 is illustrated to generally include a touch responsive screen 12, a card reading device 14, a numerical keypad 16, and a dispensing mechanism 18 for dispensing cash and receipts 18. The point-of-transaction machine 10 is additionally illustrated to generally include a deposit mechanism 20 that permits the user/customer to deposit cash, checks and executed documents and a deposit envelope holder 22. In the preferred embodiment, the point-of-transaction machine 10 is further illustrated to generally include a keyboard 24, a shelf 26 for the placement of purses, daytimers, briefcases and the like, and an arcuate surround 28 that contributes to a modern appearance of the point-of-transaction machine and increases user privacy.

With particular reference to FIG. 2, an initial screen of the touch responsive screen 12 of the point-of-transaction machine 10 is illustrated. The initial screen greets the particular user in response to insertion of a readable card (not shown), such as a magnetically readable card, and provides various options for financial transactions. In one particular application, the readable card is coded so as to generate a specific user screen that only includes options authorized for use by the customer. The readable card is preferably a card specifically designated for use with the point-of-transaction machine. Alternatively, it may be desired in certain applications to allow the user/customer to access the point of sale machine 10 with an authorized credit card.

In the application illustrated, the screen allows the user to select from the following types of financial transactions: banking A, credit union B, direct mutual fund C, credit card D, mortgage company E, brokerage house F, or other G. The other G options may include bill paying to designed service providers (e.g., utilities). While not illustrated, the point-of-transaction machine will also preferably allow a user to check stock quotations. Services fees for stock quotations can be done on a per quote basis or on a monthly or annual subscription basis. In some applications, the point-of-transaction machine 10 is further able to transmit e-mail messages.

Figure 3:
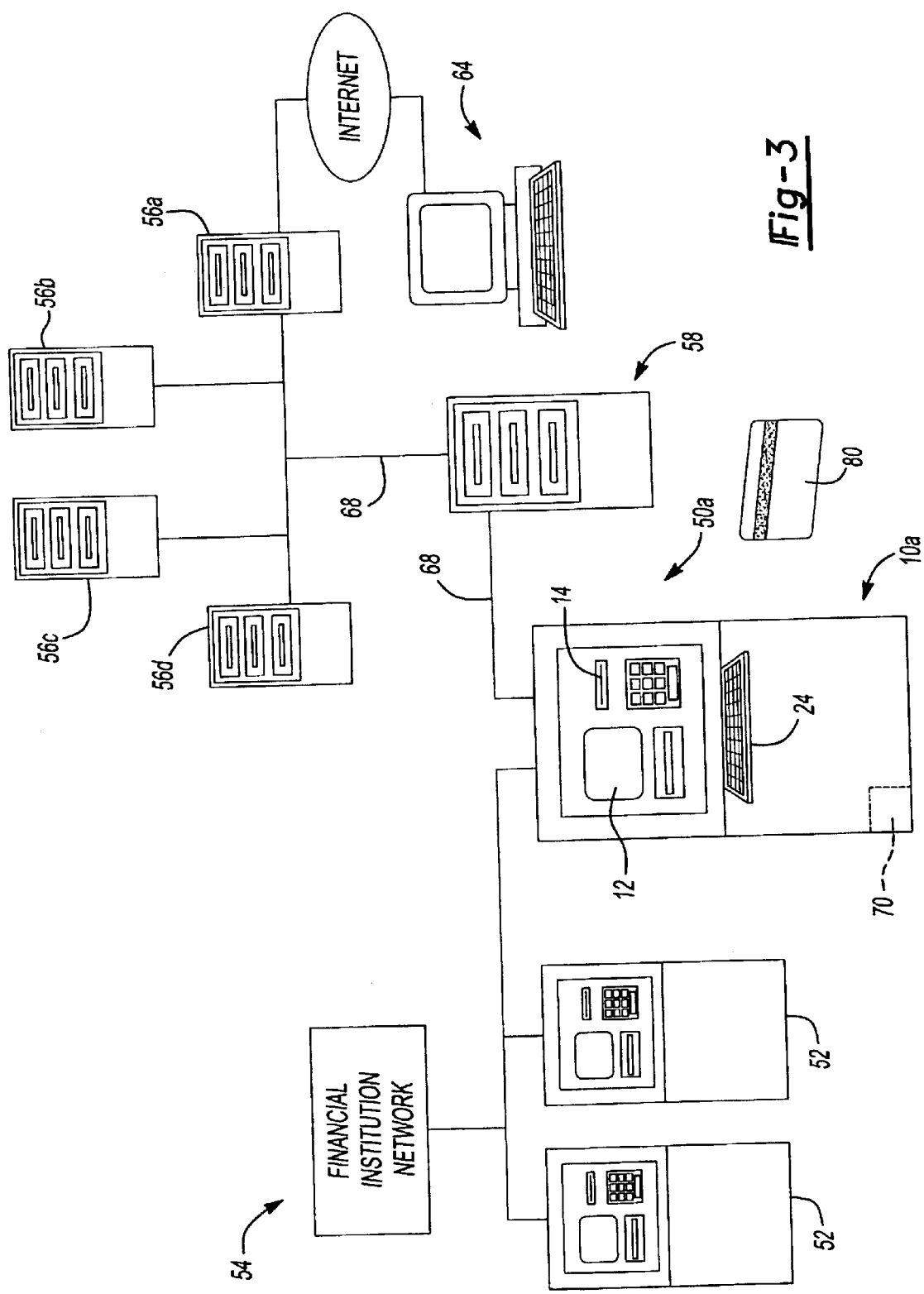
FIG. 3 is a schematic view of a first financial network constructed in accordance with the teachings of the present invention.

With reference to FIG. 3, a financial network constructed in accordance with the teachings of the present invention is generally indicated by reference numeral 50a. The financial network 50a of this example is illustrated as including one or more optional legacy ATMs 52, a financial institution network 54, one or more independent financial service servers 56, a point-of-transaction machine 10a and a financial services application server 58.

The legacy ATMs 52 are conventional in their construction and operation and are sufficiently well known in the art so as not to require a detailed discussion of their construction and operation. Briefly, the legacy ATMs 52 are coupled to the financial institution network 54 and permit users of the legacy ATMs 52 to conduct financial transactions (e.g., deposits, withdrawals and balance inquiries, hereinafter referred to as "banking transactions") from an account at a particular financial institution. Those skilled in the art will appreciate that various financial institution networks may be coupled to one another to thereby permit the user of the legacy ATM 52 to access their financial institution through the legacy ATM of another financial institution. In the example provided, the legacy ATMs 52 and the financial institution network 54 communicate via a Systems Network Architecture/Synchronous Data Link Control (SNA/SDLC) protocol using a suitable messaging protocol, such as the Diebold 912 messaging protocol.

The independent financial service servers 56 are likewise conventional and sufficiently well known so as not to require a detailed discussion of their construction and operation. Briefly, each independent financial service server 56 is associated with a particular financial service provider that may, for example, provide brokerage, mortgage, utility and/or credit card servicing services. In the particular example provided, the independent financial servers 56 include a brokerage server 56a, a mortgage server 56b, a utility server 56c and a credit card servicer server 56d. The brokerage server 56a is operated by a particular brokerage house, such as E*Trade, Quick & Reilly and Charles Schwab, and enables a customer to conduct brokerage transactions through the brokerage house. The mortgage server 56b, utility server 56c and credit card servicer server 56d are likewise operated by a particular mortgage broker, utility and credit card servicer, respectively, and enable a customer to conduct transactions relating to mortgages, utilities and credit card accounts, respectively, through the mortgage broker, utility and credit card servicer, respectively. Financial transactions conducted through the independent financial service servers 56 are hereinafter referred to as "non-banking transactions". The financial network 50a is illustrated as including a set of independent financial service servers 56, each of whom provides a distinct set of financial services. Those skilled in the art will appreciate, however, that the financial network 50a may be configured with a set of independent financial service servers 56 with several of such servers providing competing services. For example, the financial network 50a may be coupled to several brokerage servers 56a to thereby permit the customer to choose amongst several brokerage houses for carrying out a particular brokerage transaction. Those skilled in the art will also appreciate that the set of independent financial service servers 56 may additionally include one or more discrete (i.e., competing) financial institution networks that are similar to the financial institution network 54 to thereby permit a customer to remotely conduct financial transactions at another financial institution.

The customer is typically identified by a financial service provider through a user identification and password, each of which being typically composed of 5 to 15 alpha-numeric characters. In some instances, the financial service provider may provide Internet access to their independent financial service server 56 to permit a customer to remotely access their accounts. In such situations, the user identification and password are ordinarily input by the customer via an alpha-numeric keyboard device at a computer terminal 64, which may be a personal computer, for example.

Communications between the independent financial service server 56 and the computer terminal 64 preferably utilize conventional and well known protocols, such as TCP/IP, which dictate the manner in which data is transmitted between the independent financial service server 56 and the computer terminal, as well as a conventional and well known languages, which dictate the structure of the data that is transmitted between the independent financial service server 56 and the computer terminal. Data may be transmitted, for example, using Hyper Text Markup Language (HTML), which leaves the visual details (appearance) of the document to the end-user software, such as an Internet Browser program.

The point-of-transaction machine 10a and the financial services application server 58 cooperate to provide a means by which both traditional ATM services and independent financial services may be provided in a relatively secure manner at a single publicly accessible terminal. More specifically, the point-of-transaction machine 10a and the financial services application server 58 cooperate to control transaction routing, perform cardholder verification and PIN processing, and provide transaction integrity management, electronic security, device monitoring, external communications protocols and node interfaces and exchanges.

The financial services application server 58 is coupled to the independent financial service servers 56 over a private frame relay 68 and is operable for sending data to and receiving data from the independent financial service servers 56 on an as needed basis. In the particular embodiment provided, the financial services application server 58 will be understood as employing TCP/IP protocol and HTML for communicating with the financial service servers 56.

The point-of-transaction machine 10a is generally similar to the point-of-transaction machine 10 and as such, will not be discussed in significant detail other than to note that it includes hardware, including at least one computer 70, and software that permit the computer 70 to communicate with the financial institution network 54 in the manner (i.e., protocol and language) of the legacy ATMs 52, as well as with the financial services application server 58. In the particular example provided, the computer 70 communicates with the financial institution network 54 via the protocol and language that is utilized by the legacy ATMs 52 (e.g., with SNA/SDLC protocol and Diebold 912 messaging). Also in the particular embodiment provided, the computer 70 communicates with the financial services application server 58 via the private frame relay 68 using the TCP/IP protocol and HTML. More specifically, the computer 70 includes a network interface card (not shown) that permits the browser software running on the computer 70 to initiate an Uniform Resource Locator (URL) request when the customer desires to conduct a transaction with a particular financial services provider. In one alternative approach, the computer 70 may be configured to communicate with both the financial institution network 54 and the financial services application server 58 utilizing the protocol and language that is utilized by the legacy ATMs 52. In this latter approach, the financial services application server 58 must adapt the HTML data received from the independent financial service servers 56 to conform to the data structure and format of the legacy ATMs 52.

Those of ordinary skill in the art will appreciate, however, that regardless of the approach taken, each and every financial service provider (i.e., each independent financial service server 56) will either need to employ a standardized data interface or that the financial services application server 58 will need to "massage" the data received from each of the independent financial service servers 56 so that the data conforms to a predefined standard that may be transmitted directly to the point-of-transaction machine 10a or alternatively converted to a protocol and language of the type that is utilized by the legacy ATMs 52.

Also alternatively, the financial services application server 58 may function solely as an intermediary that passes data between the independent financial service servers 56 and the point-of-transaction machine 10a. This configuration has the advantage over the above-described variations of providing the customer with screens for accessing accounts and conducting transactions at such financial services providers that are identical to those that they would otherwise access remotely via a computer terminal 64 as described above.

In operation, a customer preferably accesses the point-of-transaction machine 10a by inputting (e.g., swiping) a readable card 80 (e.g., a magnetically readable card) through the card reading device 14 and inputting a PIN to provide access to all of the types of financial transactions that are available through the point-of-transaction machine 10a. Configuration in this manner avoids the burden of redundant authentication. Alternatively, the keyboard 24 and/or the touch responsive screen 12 may be utilized to manually input the customer's password and user identification in the event that the customer desires to access one or more of the independent financial service servers 56.

The point-of-transaction machine 10a may be configured to utilize any desired type of readable card, and as such, the readable card 80 may be of a relatively simple type that only includes a magnetic strip that contains account number data, for example. Additionally or alternatively, the point-of-transaction machine 10a may be configured to read other types of readable cards, such as those having micro-chips which will be referred to hereinafter as Universal Account Cards (UAC). Such UAC's are able to store information, including the balance, of various accounts that are established for the convenience of the customer. One account may be utilized for payment of mass transit or for products purchased from vending machines, for example, wherein funds are prepaid into the account by the user and thereafter the account is electronically debited when the UAC (i.e., the account) is utilized to purchase services or products. Accordingly, the point-of-transaction machine 10a may be utilized to review the balance of such accounts and electronically deposit funds or withdraw funds from such accounts. As such financial transactions are not traditional "banking transactions", they will be considered herein as "non-banking transactions".

As those skilled in the art will appreciate, any means may be employed for correlating the readable card 80, the PIN and a customer's various user identification and password codes. In the example provided, the financial services application server 58 includes a user identification/password database that is accessible when the readable card 80 is swiped, the corresponding PIN is input and financial services other than those that are available through the financial institution network 54 are requested by the customer at the point-of-transaction machine 10a. Verification of the PIN number (i.e., correlation of the readable card 80 to the PIN number) preferably occurs through the financial services application server 58 but may alternatively occur through the financial institution network 54 and relayed to the financial services application server 58 via the point-of-transaction machine 10a.

Alternatively, the financial institution network 54 may include a user identification/password database that is accessible when the readable card 80 is swiped and the corresponding PIN is input and verified through the financial institution network 54. When financial services other that those that are available through the financial institution network 54 are requested by the customer at the point-of-transaction machine 10a, the user identification and password codes are transmitted to the financial services application server 58 via the point-of-transaction machine 10a.

Figure 4:
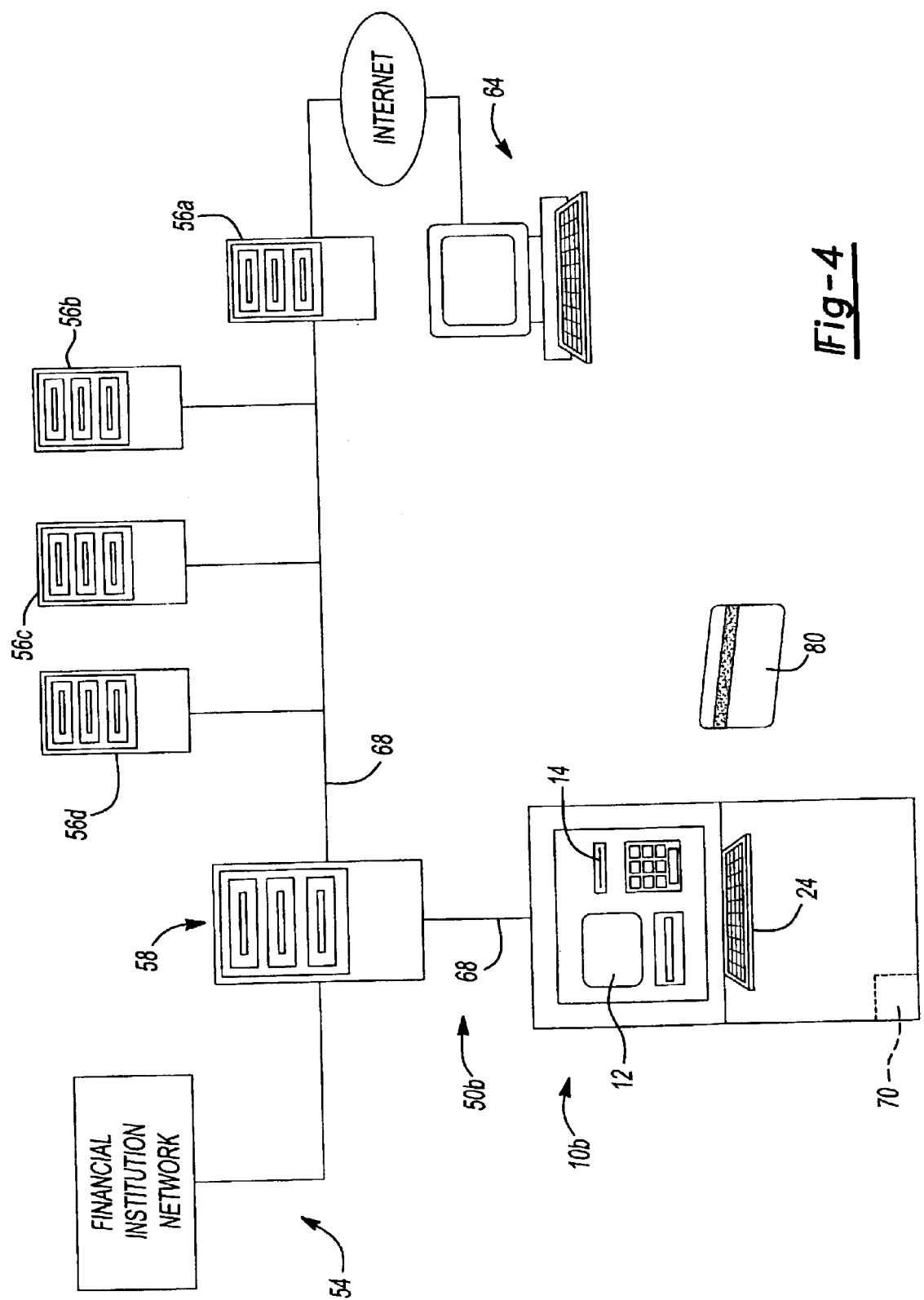
FIG. 4 is a schematic view of a second financial network constructed in accordance with the teachings of the present invention.

With reference to FIG. 4, a second financial network constructed in accordance with the teachings of the present invention is generally indicated by reference numeral 50b. The financial network 50b of this example is generally similar to the financial network 50a, except that a) it does not include legacy ATMs; b) a point-of-transaction machine 10b has been substituted for the point-of-transaction machine 10a; and c) the financial services application server 58a is coupled to both the independent financial service servers 56 and the financial institution network 54. The point-of-transaction machine 10b is identical to the point-of-transaction machine 10a except that it is configured to exclusively communicate with the financial services application server 58.

As noted above, the financial services application server 58 is employed to access both the independent financial service servers 56 and the financial institution network 54. The financial services application server 58 preferably communicates with the independent financial service servers 56, the financial institution network 54 and the point-of-transaction machine 10b utilizing Internet protocols and languages (e.g., TCP/IP and HTML) but may alternatively employ Internet protocols and languages to communicate with the independent financial service servers 56, another protocol and language to communicate with the financial institution network 54 and either of these protocol and language combinations to communicate with the point-of-transaction machine 10b.

While the invention has been described in the specification and illustrated in the drawings with reference to various preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claim(s).

What is claimed is:

1. A point-of-transaction machine comprising:

a touch responsive screen;

a card having a microchip with a memory, the memory being configured to store information related to a plurality of accounts associated with a plurality of separate institutions, the accounts being segregable into at least two types of account types, the account types including banking accounts and non-banking accounts;

a card reader for reading from and writing to the memory of the microchip, the card reader reading the stored information from the memory to permit a customer to selectively conduct transactions with the plurality of separate institutions including banking transactions with one or more of the banking accounts and non-banking transactions with one or more of the non-banking accounts;

a numerical keypad; and a deposit mechanism for receiving deposit cash, checks, executed documents and combinations thereof from the customer;

wherein the screen initially provides the customer with options on which of the plurality of separate institutions and which of the plurality of accounts they want to transact business and satisfies banking, mortgage, and security laws requiring the separate and distinct maintenance of such accounts; and wherein the point-of-transaction machine collects fees for each transaction-according to a predetermined fee schedule.

2. A financial network comprising:

a financial institution network associated with a financial institution;

a card having a microchip with a memory, the memory being configured to store information related to a plurality of accounts associated with a plurality of separate institutions, the accounts being segregable into at least two types of account types, the account types including banking accounts and securities accounts;

at least one financial service server, each financial service server being associated with a financial service provider that is independent of the financial institution network; and accessing means electronically coupled to the financial institution network and the at least one financial service server for providing access thereto via the microchip and a predetermined customer code, the accessing means including a point-of-transaction machine with a card reader, inputting means and a deposit device, the card reader being operable for reading from and writing to the memory of the microchip, the card reader reading the stored information from the memory to permit a customer to selectively conduct transactions with the plurality of separate institutions including banking transactions with one or more of the banking accounts and securities transactions with one or more of the securities accounts, the inputting means being configured to permit the customer to input information, the deposit device being configured for receiving deposits of cash, checks, executed documents and combinations thereof from the customer.

3. The financial network of claim 2, wherein the inputting means is selected from a group consisting of keypads, keyboards, touch-responsive screens and combinations thereof.

4. The financial network of claim 2, wherein the accessing means includes a financial services application server and a private frame relay, the private frame relay being employed to transmit data between the point-of-transaction machine and the financial services application server, the private frame relay further being employed to transmit data between the financial services application server and the at least one financial service server.

5. The financial network of claim 4, wherein private frame relay is further operable for transmitting data between the financial institution network and the financial services application server.

6. The financial network of claim 4, wherein the point-of-transaction machine is directly coupled to the financial institution network.

7. The financial network of claim 6, wherein the point-of-transaction machine utilizes a SNA/SDLC control protocol for communicating with the financial institution network.

8. The financial network of claim 7, wherein the point-of-transaction machine utilizes a Diebold 912 messaging protocol for communicating with the financial institution network.

9. The financial network of claim 4, wherein the point-of-transaction machine utilizes a TCP/IP protocol for communicating with the financial services application server.

10. The financial network of claim 9, wherein the point-of-transaction machine further utilizes a HTML language for communicating with the financial services application server.

11. The financial network of claim 4, wherein one of the financial services application server and the financial institution network includes a database having a user identification code and a password code that identify the customer and authorize an associated financial transaction at an associated financial services provider.

12. A method for conducting a plurality of financial transactions comprising:

providing a card having a microchip with a memory, the memory being configured to store information related to a plurality of accounts associated with a plurality of separate institutions, the accounts being segregable into at least two types of account types, the account types including banking accounts and securities accounts;

providing a point-of-transaction machine having a card reader, inputting means and a deposit device, the card reader being operable for reading information stored on the memory of the microchip, the inputting means being configured to permit a customer to input information, the deposit device being configured for receiving deposits of cash, checks, executed documents and combinations thereof from the customer;

placing a card in the card reader;

reading the stored information from the memory of the microchip to permit the customer to selectively conduct transactions with the plurality of separate institutions including banking transactions with one or more of the banking accounts and securities transactions with one or more of the securities accounts inputting a PIN;

selecting one or more transactions from a group of financial transactions, the group including banking transactions and securities transactions, the banking transactions including cash deposits; and levying a fee according to a predetermined fee schedule for conducting the financial transaction.

13. The method of claim 12, further comprising the steps of:

correlating the card and the PIN to a user identification code and a password code; and forwarding the user identification code and the password code to a server to authorize the securities transaction.

14. The method of claim 12, wherein the fee is levied against the customer.

15. The method of claim 12, further comprising the step of transmitting information between the point-of-transaction machine and a server to conduct the securities transaction.

16. The method of claim 15, wherein the server is associated with at least one of a brokerage house and a mutual fund.

17. The method of claim 15, wherein the information is transmitted over a private frame relay.

18. The method of claim 12, further comprising the steps of:

manually inputting a user identification code and a password code; and forwarding the user identification code and the password code to a server to authorize the securities transaction.

* * * * *